(12) United States Patent
Gocho et al.

(10) Patent No.: US 8,830,049 B2
(45) Date of Patent: Sep. 9, 2014

(54) VEHICLE DISPLAY DEVICE

(75) Inventors: Miyuki Gocho, Saitama (JP); Syuiti Sakamoto, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 193 days.

(21) Appl. No.: 13/394,903

(22) PCT Filed: Oct. 27, 2010

(86) PCT No.: PCT/JP2010/069019
§ 371 (c)(1),
(2), (4) Date: Mar. 8, 2012

(87) PCT Pub. No.: WO2011/065173
PCT Pub. Date: Jun. 3, 2011

(65) Prior Publication Data
US 2012/0169489 A1    Jul. 5, 2012

(30) Foreign Application Priority Data

Nov. 30, 2009 (JP) .................................. 2009-272062

(51) Int. Cl.
| | |
|---|---|
| B60Q 1/00 | (2006.01) |
| G05D 23/00 | (2006.01) |
| B60K 37/02 | (2006.01) |
| G01D 11/28 | (2006.01) |

(52) U.S. Cl.
CPC .......... *B60K 37/02* (2013.01); *B60K 2350/1064* (2013.01); *B60W 2550/12* (2013.01); *B60K 2350/1076* (2013.01); *G01D 11/28* (2013.01)
USPC .......................................... 340/449; 165/287

(58) Field of Classification Search
CPC ............... B60K 2350/1064; B60K 2350/1076; B60W 2550/12
USPC ....................... 340/449, 425.5, 438, 459–462, 340/584–599; 165/287, 59, 64; 62/3.3
See application file for complete search history.

(56) References Cited

U.S. PATENT DOCUMENTS 4,270,362 A * 6/1981 Lancia et al. ................... 62/173
4,326,667 A * 4/1982 Murata et al. ............ 237/12.3 A (Continued)

FOREIGN PATENT DOCUMENTS

| JP | 05-025335 U | 4/1993 |
|---|---|---|
| JP | 05-091921 U | 12/1993 |

(Continued)

*Primary Examiner* — Benjamin C Lee
*Assistant Examiner* — Sigmund Tang
(74) *Attorney, Agent, or Firm* — Foley & Lardner LLP

(57) ABSTRACT

A vehicle meter apparatus has a judging section that judges whether an automatic air conditioner purpose ambient temperature sensor is provided by comparing an input signal value inputted from an automatic air conditioner to an input section with a set threshold value and judges whether a display purpose ambient temperature sensor is provided by comparing the input signal value inputted from the display purpose ambient temperature sensor with the set threshold value when an internal power supply is supplied to input section and a display output section which displays an ambient temperature external to the vehicle on a second display section on a basis of a temperature detection signal from either of these sensors in a case where the judging section judges that the automatic air conditioner ambient temperature sensor is provided and in a case where the judging section judges that the display purpose ambient temperature is provided.

2 Claims, 3 Drawing Sheets

(56) References Cited

U.S. PATENT DOCUMENTS

| | | | |
|---|---|---|---|
| 4,580,620 A * | 4/1986 | Fukumoto et al. | 165/202 |
| 4,635,445 A * | 1/1987 | Otsuka et al. | 62/158 |
| 4,901,788 A * | 2/1990 | Doi | 165/204 |
| 5,148,710 A * | 9/1992 | Gudehus et al. | 73/335.06 |
| 5,181,553 A * | 1/1993 | Doi | 165/203 |
| 5,547,125 A * | 8/1996 | Hennessee et al. | 236/49.3 |
| 6,078,853 A * | 6/2000 | Ebner et al. | 701/36 |
| 6,206,084 B1 * | 3/2001 | Wieszt | 165/11.1 |
| 6,709,155 B2 * | 3/2004 | Knittel et al. | 374/141 |
| 2002/0152972 A1 * | 10/2002 | Iwasaki et al. | 123/41.44 |
| 2006/0156276 A1 * | 7/2006 | Brown et al. | 717/104 |
| 2011/0048671 A1 * | 3/2011 | Nishikawa et al. | 165/42 |
| 2011/0114739 A1 * | 5/2011 | Misumi et al. | 236/49.3 |

FOREIGN PATENT DOCUMENTS

| | | |
|---|---|---|
| JP | 2003-315108 A | 11/2003 |
| JP | 2006-016766 A | 1/2006 |
| JP | 2007-331442 A | 12/2007 |
| JP | 2008-260314 A | 10/2008 |

* cited by examiner (a)

(b)

(c)

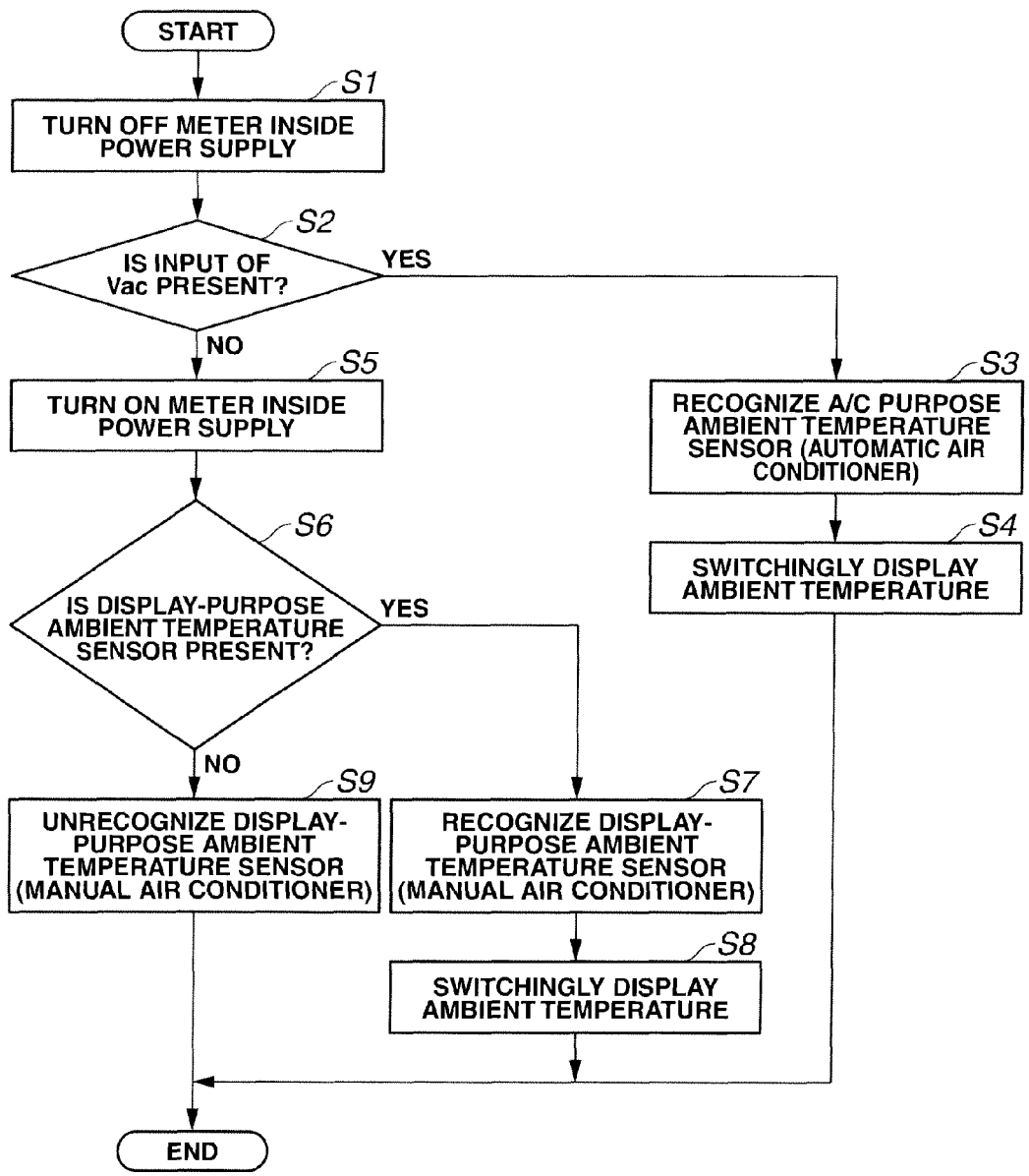

VEHICLE DISPLAY DEVICE

TECHNICAL FIELD

The present invention relates to a display apparatus for a vehicle which is capable of displaying an ambient temperature external to the vehicle on a display section such as an instrument panel of the vehicle.

BACKGROUND ART

An air conditioner (A/C) to perform an air conditioning control within a passenger compartment is mounted in a vehicle such as an automotive vehicle. The air conditioner for the vehicle includes: an automatic air conditioner which automatically adjusts an air conditioning temperature, a nozzle air flow rate, and so forth on a basis of a sensor information from a plurality of sensors so that the temperature of the passenger compartment of the vehicle becomes equal to a set temperature when the vehicular occupant sets the temperature initially; and a manual air conditioner which manually adjusts a temperature, a bowing wind, and so forth blown out from the nozzle in accordance with a manual operation of the vehicular occupant. It should be noted that the automatic air conditioner is provided with the ambient temperature sensor since the ambient temperature of the vehicle is used as a control information but no ambient temperature sensor is provided in the case of the manual air conditioner the ambient temperature sensor is not used as the ambient temperature information.

In addition, since a recent vehicle (automotive vehicle) in which the automatic air conditioner is mounted is provided with the ambient temperature sensor, the ambient temperature can switchingly be displayed on the display section (for example, a liquid crystal display section) (refer to a Patent Document 1) within the instrument panel having a speedometer located on a front side of the passenger compartment on a basis of a temperature information detected by the ambient temperature sensor.
Pre-published Document
Patent document
  A Patent Document 1: a Japanese Patent Application (first) Publication (tokkai) No. 2003-315108

DISCLOSURE OF THE INVENTION

Task to be Solved by the Invention

Since the display purpose ambient temperature sensor is not provided in a conventional vehicle (automotive vehicle) in which the manual air conditioner is mounted, the ambient temperature cannot be displayed on the display section within the instrumental panel. In this way, although the ambient temperature can be displayed in a case where the automatic air conditioner is mounted in the vehicle in a conventional vehicular meter apparatus, the ambient temperature cannot be displayed in a case where the manual air conditioner is mounted in the vehicle.

However, in recent years, there is a strong demand by vehicle users that the ambient temperature is desired to be displayed on the display section within the instrument panel with the display purpose ambient temperature mounted even in the vehicle (automotive vehicle) in which the manual air conditioner is mounted. However, in the conventional vehicular display apparatus as described above, a detection that the display purpose ambient temperature sensor is provided cannot be made and the ambient temperature for the vehicle cannot be displayed for the vehicle having the manual air conditioner. Therefore, for the vehicle having the manual air conditioner and display purpose ambient temperature sensor, it is necessary to install an exclusive vehicular display apparatus which can be structured to enable the detection of the display purpose ambient temperature sensor.

Therefore, it is an object of the present invention to provide a display apparatus for a vehicle which is capable of displaying the ambient temperature without installing the exclusive-use vehicular display apparatus for the vehicle in which the automatic air conditioner is mounted and for the vehicle in which the manual air conditioner is mounted and display purpose ambient temperature sensor is provided.

Means for Solving the Task

To achieve the object described above, according to the present invention, a display apparatus for both vehicles, one of the vehicles being equipped with an automatic air conditioner having an automatic air conditioner purpose ambient temperature sensor and the other of the vehicles being equipped with a manual air conditioner having a display purpose ambient temperature sensor, comprising: a display section capable of displaying an ambient temperature external to the vehicle; a judging section configured to judge whether the automatic air conditioner purpose ambient temperature sensor is provided by comparing an input signal value inputted from the automatic air conditioner to an input section with a set threshold value and to judge whether the display purpose ambient temperature sensor is provided by comparing the input signal value inputted from the display purpose ambient temperature sensor with the set threshold value when an internal power supply is supplied to the input section; and a display output section configured to display the ambient temperature external to the vehicle on the display section on a basis of a temperature detection signal from the automatic air conditioner purpose ambient temperature sensor or the display purpose ambient temperature sensor in a case where the judging section judges that the automatic air conditioner ambient temperature sensor is provided and in a case where the judging section judges that the display purpose ambient temperature is provided.

In addition, according to the present invention as described in claim 2, the display section is constituted by a liquid crystal display and is capable of switching the display other than the ambient temperature through an operation of a vehicle occupant.

EFFECT OF THE INVENTION

Since, according to the present invention, the judgment that the automatic air conditioner ambient temperature sensor or the display purpose ambient temperature sensor is provided can be made in a case where the automatic air conditioner having the automatic air conditioner purpose ambient temperature sensor is mounted in the vehicle and in a case where the manual air conditioner is mounted in the vehicle and the display purpose ambient temperature sensor is provided in the vehicle, the ambient temperature can be displayed without installations for respectively exclusive-use vehicular meter apparatuses.

BRIEF DESCRIPTION OF THE DRAWINGS

[FIG. 4] is a flowchart representing a display control for the ambient temperature by means of the meter control section.

DESCRIPTION OF THE EMBODIMENT

Figure 1:
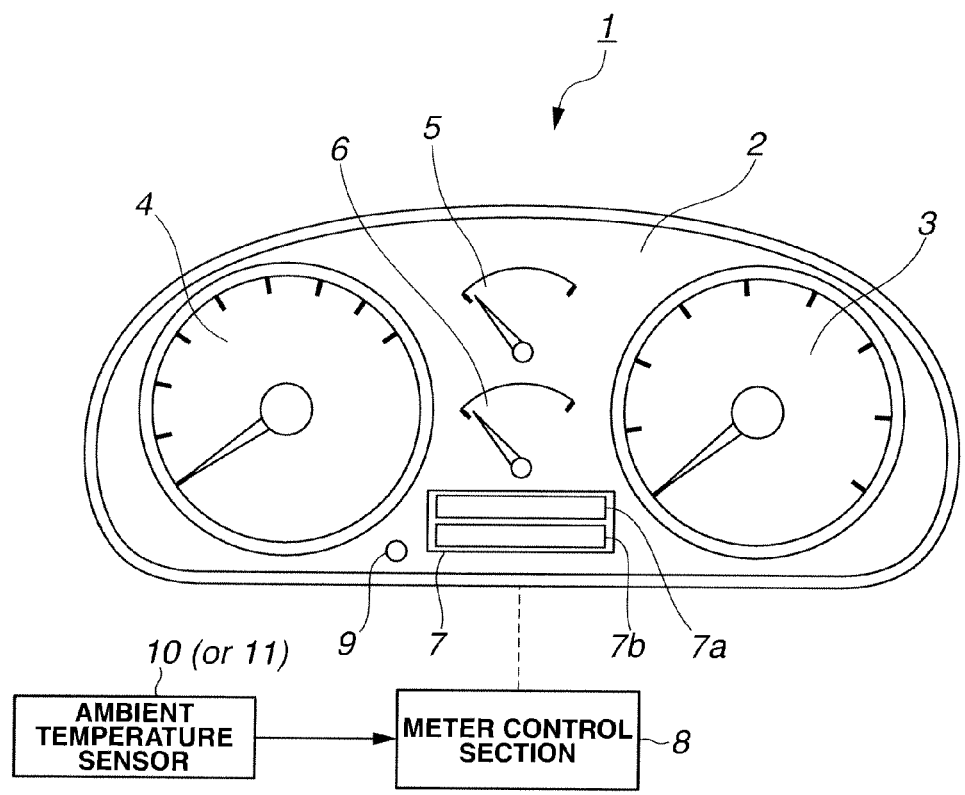
[FIG. 1] is a front view representing one example of a display apparatus for a vehicle in which a display apparatus according to the present invention is applicable to a vehicular meter apparatus.

Reference will, hereinafter, be made to the drawings in order to facilitate a better understanding of the present invention. FIG. 1 shows a front view representing one example of a preferred embodiment in which the vehicular display apparatus is applicable to a vehicular meter apparatus.

As shown in FIG. 1, vehicular meter apparatus 1 in the preferred embodiment according to the present invention is mounted in front of a passenger compartment (automotive vehicle). Speedometer 3, a tachometer (engine speed meter) 4, a cooling water temperature meter 5, a fuel gage (fuel level meter) 6, a liquid crystal display meter 7, and so forth are mounted. Each pointer drive section (not shown) of these meters (speedometer 3, tachometer 4) and instrument (cooling water temperature meter 5, fuel gauge 6) are drivingly controlled on a basis of the signal from a meter control section 8. In addition, meter control section 8 is installed on an inside of a meter panel 2.

Figure 2:
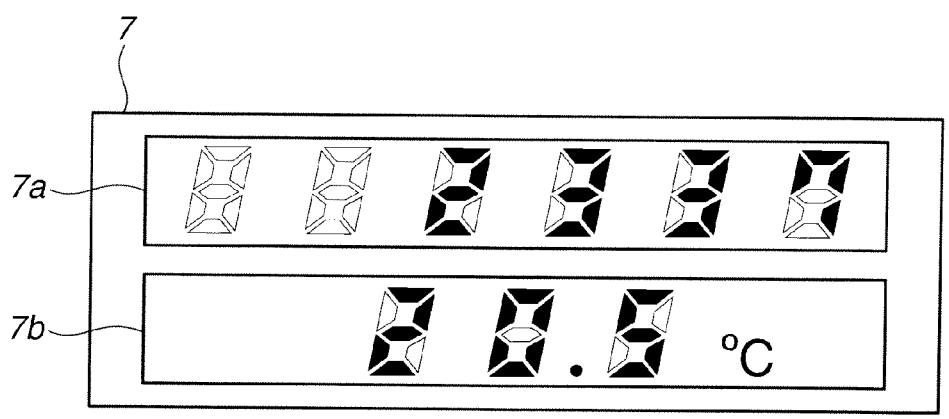
[FIG. 2] is a view representing one example of a liquid crystal display section.

Liquid crystal display section 7, as shown in FIG. 2, includes: a first display section 7a displaying an accumulated distance traveled by the vehicle; and a second display section 7b to switchingly be displayed through a switching operation with a changeover switch 9. The ambient temperature, the time, and the traveled distance through second display section 7b are switched in the sequence by a switching operation with changeover switch 9. It should be noted that FIG. 2 shows a state in which the ambient temperature is displayed on second display section 7b. Meter control section 8 can display the ambient temperature to second display section 7b on a basis of a temperature detection signal inputted from automatic air conditioner purpose ambient temperature sensor (hereinafter, referred to as an air conditioner purpose ambient temperature sensor as will be described later or display purpose ambient temperature sensor 11).

In addition, although the air conditioner (the vehicular air conditioner) to perform the air conditioning control within the passenger compartment is mounted in the vehicle (automotive vehicle) in which vehicular meter apparatus 1 is mounted, this vehicular air conditioner is classified into two of automatic air conditioners, namely, the automatic air conditioner which automatically adjusts the air conditioning temperature and nozzle wind quantity blown out from the nozzle on the basis of the sensor information from the plurality of sensors and the manual air conditioner which manually adjusts the air conditioning temperature and temperature and flow rate of the air conditioned wind blown out from the nozzle.

Figure 3:
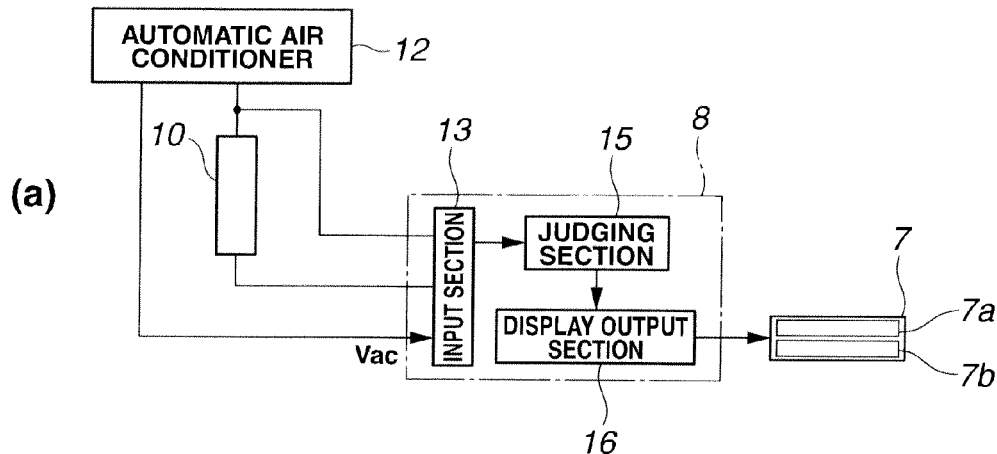
[FIG. 3 (a)] is a view representing one example of a structure in which an automatic air conditioner purpose ambient temperature sensor is connected to a meter control section, [FIG. 3(b)] is a view representing one example of the structure in which a display purpose ambient temperature sensor is not connected to the meter control section, and [FIG. 3(c)] is a view representing one example of the structure in which the display purpose ambient temperature sensor is connected to the meter control section.
Figure 3:
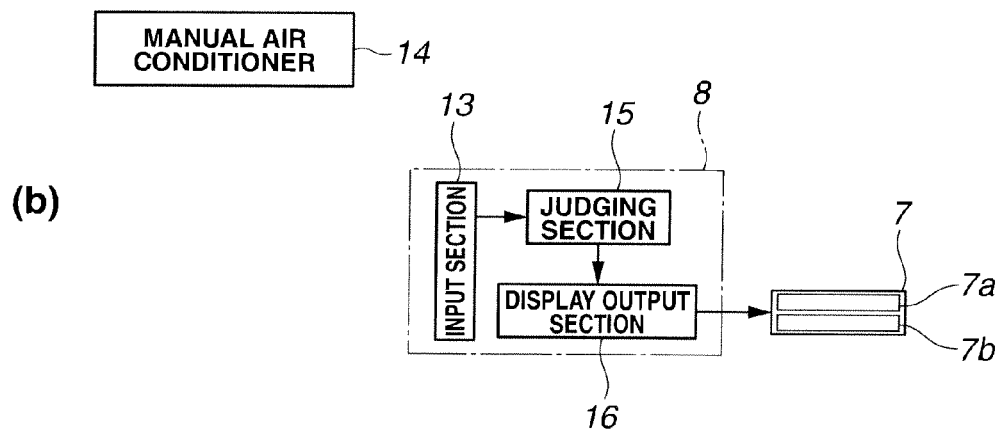
Figure 3:
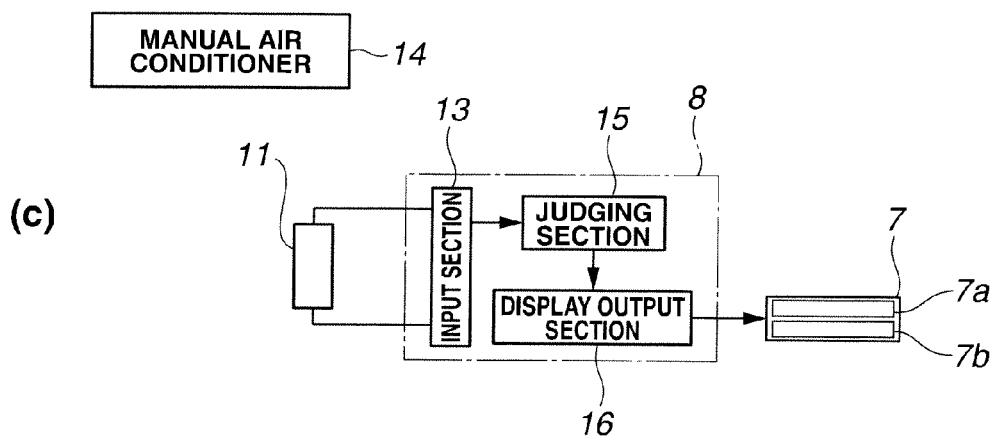

That is to say, as shown in FIG. 3(a), in a case where automatic air conditioner 12 is mounted in the vehicle, air conditioner purpose ambient temperature sensor 10 used in the air conditioning control for automatic air conditioner 12 is installed at a predetermined location (for example, in the vicinity to the front portion within an engine compartment) and a manual air conditioner which automatically adjusts the temperature and the wind quantity on a basis of the sensor information from a plurality of sensors with a manual operation of the vehicular occupant blown out from the nozzle. In addition, the ambient temperature information detected by means of automatic air conditioning ambient temperature sensor 10 is inputted also to input section 13 of meter control section 8. Furthermore, a sensor pull-up voltage (hereinafter, referred to as a voltage of "Vac") is inputted to an input section 13 of meter control section 8. Hence, meter control section 8 is electrically connected to automatic air conditioner 12 and air conditioning purpose ambient temperature sensor 10. Hence, in a case where automatic air conditioner 12 is mounted in the vehicle, the ambient temperature can be displayed on second display section 7b of liquid crystal display section 7.

In addition, in a case where manual air conditioner 14 is mounted in the vehicle, as appreciated from FIGS. 3(b) and 3(c), two patterns of a structure in which display purpose ambient temperature sensor 11 is not connected (FIG. 3(b)) to meter control section 8 and in which display purpose ambient temperature sensor 11 is connected to mater control section 8 (FIG. 3(c)).

In a case of FIG. 3(b), manual air conditioner 14 is not electrically connected to meter control section 8 and display purpose ambient temperature sensor 11 is not provided. Hence, even if manual air conditioner 11 is mounted in the vehicle, the display purpose ambient temperature sensor 11 is not connected to mater control section 8. In this case, the ambient temperature is not displayed on second display section 7b of liquid crystal display section 7.

In addition, in a case of FIG. 3(c), manual air conditioner 14 is not electrically connected to imeter control section 8 but display purpose ambient temperature sensor 11 is electrically connected to input section 13 of meter control section 8. Hence, even if manual air conditioner 14 is mounted in the vehicle, display purpose ambient temperature sensor 11 is connected to meter control section 8 so that the ambient temperature can be displayed on second display section 7b of liquid crystal display section 7.

Meter control section 8 is provided with an input section 13, a judging section 15, and a display output section 16 which judge whether either A/C (air conditioner) purpose ambient temperature sensor 10 or display purpose ambient temperature sensor 11 is connected to meter control section 8 and to display the ambient temperature on second display section 7b of liquid crystal display section 7.

Input section 13 inputs a temperature detection signal and Vac outputted from air conditioner (A/C) ambient temperature sensor 10 when automatic air conditioner 12 is mounted in the vehicle and air conditioner ambient temperature sensor 10 is connected to meter control section 8 and inputs the temperature detection signal outputted from display purpose ambient temperature sensor 11 when manual air conditioner 14 is mounted and display purpose ambient temperature sensor 11 is connected to meter control section 8.

It should be noted that an electrical power is supplied to air conditioner purpose ambient temperature sensor 10 from automatic air conditioner side 12. In addition, when display purpose ambient temperature sensor 11 is connected to meter control section 8, the power is supplied to display purpose ambient temperature sensor from meter control section 8 side.

Judging section 15 judges whether air conditioned ambient temperature sensor 10 is provided or whether display purpose ambient temperature sensor 11 is provided. Display output section 16 can display the ambient temperature on second display section 7b of liquid crystal display section 7 on a basis of a result of judging by judging section 15 when judging that air conditioner purpose ambient temperature sensor 10 is provided or display purpose ambient temperature sensor 11 is provided.

Next, a display control of the ambient temperature by means of meter control section 8 will be described with reference to the flowchart shown in FIG. 4.

At first, an electrical power supplied from meter control section 8 (hereinafter, referred to as a meter inside power supply) is turned to OFF to input section 13 of mater control section 8 when ignition switch (IGN) is in an ON state. Then, a judgment is made of whether Vac is inputted to input section 13 to judge whether air conditioner (A/C) purpose ambient temperature sensor 10 is provided (namely, whether automatic air conditioner 12 is mounted in the vehicle).

If above-described Vac is judged to be inputted to input section 13 (step S2: YES) at the judgment of step S2, judging section 15 recognizes that air conditioner purpose ambient temperature sensor 10 is provided in judgment section 15. Thus, in this case, the structure shown in FIG. 3(a) will be described. The temperature detection signal is outputted from air conditioner purpose ambient temperature sensor 10 to display output section 16 via input section 13, judging section 15. Thus, the ambient temperature is displayed on second display section 7b of liquid display section 7 (step S4). If Vac is judged to be inputted to input section 13 (step S2: YES), meter inside power supply is maintained to be in OFF state.

As a method of judgment of Vac input at step S2, judging section 15 judges whether the input voltage value is equal to or higher than a preset Vac voltage threshold value and judges that Vac is inputted in a case where the input voltage value is equal to or larger than this threshold value.

Then, in a case where Vac is not inputted to input section 13 at the judgment of step S2 (step S2: NO), judging section 15 recognizes that the air conditioner purpose ambient temperature sensor 10 is not provided (namely, automatic air conditioner 12 is not mounted in the vehicle) and turns the meter inside power supply which is in the OFF state to ON state (step S5).

Next, judging section 15 judges whether display purpose ambient temperature sensor 11 is connected to meter control section 8 (judges whether display purpose ambient temperature sensor 11 is provided) at step S6.

It should be noted that, in a case where display purpose ambient temperature sensor 11 is connected to input section 13, when the meter inside power supply which has been turned to OFF is, then, turned to ON, the electrical power is supplied to display purpose ambient temperature sensor 11 from meter control section 8 (input section 13).

In a case where the temperature detection signal from display purpose ambient temperature sensor 11 is judged to be inputted to input section 13 (step S6: YES), judging section 15 recognizes that display purpose ambient temperature sensor 11 is provided (step S7). Thus, in this case, as shown in the structure of FIG. 3(c), manual air conditioner 14 is mounted in the vehicle but the temperature detection signal outputted from display purpose ambient temperature sensor 11 is outputted to display purpose ambient temperature sensor via input section 12 and judging section 15 (step S8).

It should be noted that the method of judgment of whether display purpose ambient temperature sensor 11 at step S6 is provided is that, for example, the input voltage value is equal to or higher than the preset sensor voltage threshold value and, if the input voltage value is equal to or higher than this threshold value, the temperature detection signal is judged to be inputted to the temperature detection signal from display purpose ambient temperature sensor 11.

In the judgment at step S6, in a case where the temperature detection signal is judged to be not inputted from display purpose ambient temperature sensor 11 (step S6: NO), judging section 15 recognizes that display purpose ambient temperature sensor 11 is not provided (step S9). Hence, in this case, in a case of the structure of FIG. 3(b), manual air conditioner 14 is mounted in the vehicle but display purpose ambient temperature sensor is not provided so that the display of ambient temperature cannot be made. In this way, in a case of FIG. 3(b), even if the vehicular occupant performs the switching operation for switch 9, the ambient temperature is not displayed on second display section 7b of liquid crystal display section and, in turn, the displayed content is switchingly be displayed in the sequence of, for example, the time and the distance traveled by the vehicle.

As described in vehicular meter apparatus in the preferred embodiment, three patterns can automatically be judged as a case where air conditioner purpose ambient temperature sensor 10 is provided (automatic air conditioner 14 is mounted in the vehicle), a case where display purpose ambient temperature sensor 11 is mounted (manual air conditioner 14 is mounted in the vehicle), and a case where display purpose ambient temperature sensor 11 is not provided (manual air conditioner 14 is mounted in the vehicle) can automatically be judged. Hence, even if display purpose ambient temperature sensor 11 is provided (manual air conditioner 14 is mounted in the vehicle), the ambient temperature can be displayed without installation of the exclusive vehicular meter apparatus.

Explanation of Signs

1 . . . vehicular meter apparatus (display apparatus for a vehicle)
2 . . . meter panel
7 . . . liquid crystal display section
7a . . . second display section
8 . . . meter control section
10 . . . air conditioner purpose ambient temperature sensor
11 . . . display purpose ambient temperature sensor
13 . . . input section
14 . . . manual air conditioner
15 . . . judgment section
16 . . . display output section

The invention claimed is:

1. A display system universally adaptable to first and second types of vehicles, the first type of vehicle being equipped with an automatic air conditioner having an automatic air conditioner purpose ambient temperature sensor and the second type of vehicle being equipped with a manual air conditioner having a display purpose ambient temperature sensor, comprising:

a display section configured to display an ambient temperature external to a vehicle; and a control section configured to perform a display control of the ambient temperature for the display section, the control section including a judging section configured to:

judge whether the vehicle is equipped with the automatic air conditioner on a basis of a first judgment of whether, with an internal power supply supplied to an input section of the control section turned off, a pull-up voltage is inputted to the input section of the control section from the automatic air conditioner, after the first judgment, judge whether the automatic air conditioner purpose ambient temperature sensor is provided by comparing an input signal value inputted from the automatic air conditioner to the input section with a set threshold value, and judge whether the display purpose ambient temperature sensor is provided by comparing the input signal value inputted from the display purpose ambient temperature sensor with the set threshold value when the internal power supply is supplied to the input section; and a display output section configured to display the ambient temperature external to the vehicle on the display section on a basis of a temperature detection signal from the automatic air conditioner purpose ambient temperature sensor or the display purpose ambient temperature sensor in a case where the judging section judges that the automatic air conditioner ambient temperature sensor is provided and in a case where the judging section judges that the display purpose ambient temperature sensor is provided.

2. The display system as claimed in claim 1, wherein in a case where the judging section judges that the automatic air conditioner purpose ambient temperature sensor is not provided and judges that the display purpose ambient temperature sensor is not provided, the judging section judges that the vehicle is equipped with the manual air conditioner and is unequipped with the display purpose ambient temperature sensor.

* * * * *